USO05533467A

United States Patent [19]

Lancia

[11] Patent Number: 5,533,467
[45] Date of Patent: Jul. 9, 1996

[54] BIRD FEEDING STATION

[76] Inventor: Frederick N. Lancia, 6100 Karrer Pl., Dublin, Ohio 43017

[21] Appl. No.: 417,099

[22] Filed: Apr. 5, 1995

[51] Int. Cl.⁶ ................................................. A01K 39/01
[52] U.S. Cl. ........................................................... 119/57.9
[58] Field of Search .................................. 119/57.8, 57.9, 119/52.2, 52.3

[56] References Cited

U.S. PATENT DOCUMENTS

| | | | |
|---|---|---|---|
| 2,715,386 | 5/1954 | Jones | 119/52.2 X |
| 5,044,319 | 9/1991 | Blasbalg | 119/57.9 |
| 5,095,847 | 3/1992 | Coffer | 119/52.2 |
| 5,195,460 | 3/1993 | Loken | 119/52.3 X |
| 5,289,796 | 3/1994 | Armstrong | 119/57.9 X |

Primary Examiner—Robert P. Swiatek
Assistant Examiner—Yvonne Abbott
Attorney, Agent, or Firm—Mueller and Smith

[57] ABSTRACT

A bird feeding station is described which is formed principally from commercially available PVC plumbing fittings and pipe. Because of the overall light weight of the station, it may be supported from a patio block or the like. The system is modular, being able to accommodate a variety of feeder arrangements as well as seed dispensing arrangements. This modularity also provides an opportunity for configurations which are bird species specific due to a configuration which is achieved. By virtue of the use of PVC pipe, the stations are easily cleaned by the user inasmuch as they inherently incorporate somewhat straight-through passageways providing the functions of seed reservoir and seed dispensing.

19 Claims, 3 Drawing Sheets

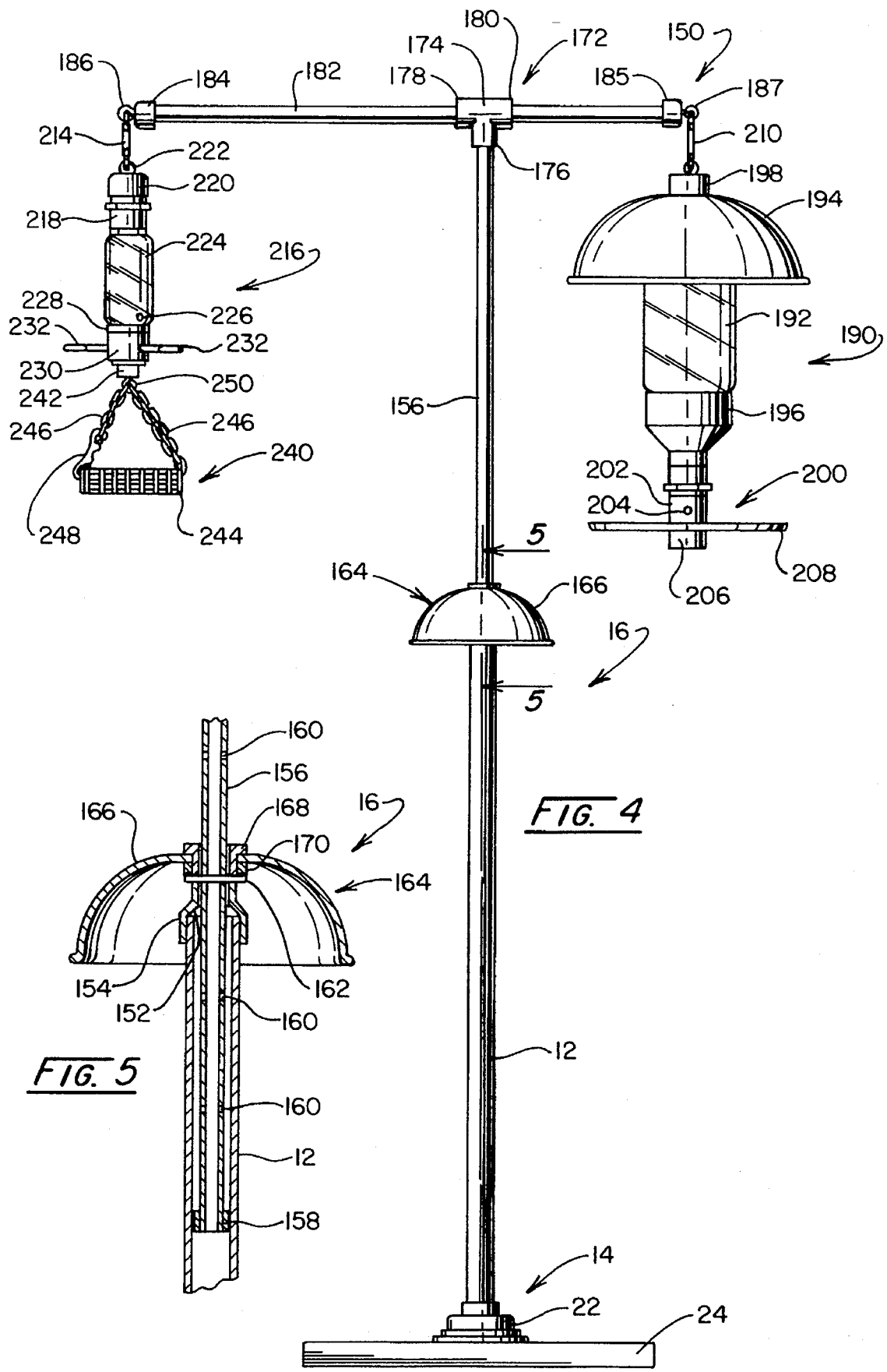

BIRD FEEDING STATION

BACKGROUND OF THE INVENTION

The enjoyment and study of wild birds has been an enterprise of great numbers of enthusiasts for centuries. This perhaps is because wild birds are the most conspicuous and most readily observed form of wildlife. As written about 50 years ago:

Everyone is aware of them in the spring when their bright colors, lively movements, and chorus of song render them inescapable, but some birds are present at all seasons. Making the acquaintance of the common varieties in your neighborhood is an excellent way to establish a closer bond with nature. It will give you an understanding of that feel of kinship with the denizens of the wild, so characteristic of primitive peoples, and you will gain an awareness of the order in the world of living things and a perspective on human problems and concerns that are beyond price. It is no accident that so many of our great men have been keen students of wild birds. Few forms of outdoor recreation have so much to offer.

*Audubon Bird Guide* by Richard H. Pough, Doubleday & Company, Inc., 1946, Garden City, N.Y.

Extensive investigations of avifouna have been carried out over the years, for example by the Ornithology Laboratory of Cornell University. Such original research also has been buttressed by many birding enthusiasts whose sighting and presence reportings have contributed to more structured professional studies.

A popular technique, of course, for observing bird life is to visit their habitats while remaining inconspicuous. Since birds tend to return again and again to a given spot for food and water, a universally popular approach to observation has been to offer food and water at a more convenient location adjacent a home or the like. By selecting such food in consonance with the species desired to be observed, the observer may achieve a form of species specific selection of bird visitation. This may permit an easier access to species which are more rare, principally because of their territorial instincts. For example, in Eastern North America, a home based wild bird feeder typically will attract only one pair of titmice or nuthatches, and perhaps a small family of chickadees. That same feeding facility also may attract a dozen cardinals, many finches and doves, and substantial numbers of ecologically favored species such as sparrows. Unless some modicum of configurational aspect is included within a bird feeder design to supplant food based species selection, the station will be somewhat overwhelmed by the more popular species. For instance, a flock of sparrows may empty a feeder in short order, rendering it ineffective for its intended or preferred purpose.

The configuration of bird feeders also should look to the avoidance of non-avian animal life. Squirrels typically jump to an extent of about five feet vertically and may be airborne from trees and other structures horizontal distances up to about 12 feet. Should such non-avian wildlife succeed in invading the bird feeder, its feeding-attraction function will be halted and, in many cases, its structure damaged by animal chewing and the like.

Successful wild bird enjoyment also requires that the feeding station be maintained in a cleaned condition. For classic wooden feeders, this is a difficult task which is usually ignored. However, for active bird feeding stations, a cleaning of their structure typically is carried out by the serious bird enthusiast on an interval of about once per week.

Where practical cost constraints are ignored, presumably, bird feeders can be designed meeting the needs of species specific operation with enhanced food replenishment procedures. Additionally, such stations can, from time to time, be made invasion-proof to squirrels, black snakes, and the like, and may incorporate cleaning systems of elaborate design. However, for the typical consumer-bird enthusiast, such approaches are seen to be economically unattainable.

SUMMARY

The present invention is addressed to a bird feeding station apparatus which readily accommodates to attracting select species of wild birds with a combination of both structural configuration and seed selection. Modularity is developed both with respect to the provision of modular, bird feeding assemblies, and through the provision of a second level of modularity permitting combinations of seed dispensing sub-modules which are readily attached to the bird feeder assemblies.

In addition to a desirable design modularity, the bird feeding stations are struturally immune to both the effects of weather, as well as to the rigorous usage thereof by various forms of wildlife. Formed typically of PVC plastic approved by the National Sanitation Foundation, the modular structures are easily cleaned by the user. In this regard, the assembly structure of the feeding arrangement is configured with a tubular theme which achieves "straight through" passageways of limited length through which conventional bottle cleaning brushes or the like may be drawn. Because of the highly smooth surfaces of the PVC forming materials, dirt and debris commonly encountered in the feeders are removed with relative ease. The modular structure of the feeding stations further facilitates cleaning, inasmuch as the modular feeding assemblies are easily removed from the station support structure, typically by unclipping a simple but robust snap hook. Further, the sub-module components unclipping unscrew for disassembly and subsequent cleaning.

Ease of installation of the bird feeding stations is realized both through the above-described features and modularity, and through a unique suspension structure which takes advantage of the substantial rigidity and light weight of the plastic materials employed, for example, an elongate stanchion of diameter at least about 2 inches employed as a principal structural member. That diameter provides fully adequate post rigidity, while remaining quite light in weight. The diameter and smooth surface of the stanchion discourages climbing by predators. For instance, squirrels of conventional size are unable to reach sufficiently around the pipe structure with their front paws to gain a clinging hold sufficient to ascend to the feeder modules.

Within the stanchion, there preferably is positioned a PVC plastic extender pipe which may be drawn upwardly and secured to provide a desirable feeder height adjustment feature. Through the use of a transverse coupling attached to the extender pipe, two or more feeding assembly modules may be provided at a given feeding station. The slight horizontal slideable aspect of such a transverse coupling permits the user to adjust the horizontal extent of the support from the stanchion to permit the balancing of a heaver feeding module against the weight of a lighter feeding module to assure verticality and good aesthetic appearance of the station itself.

The above multiple advantageous features of the feeder station are achieved at practical cost through a fabrication and assembly which involves essentially only conventional PVC forming components typically used in the plumbing trade with minor adaptations. Thus, advantage is taken of the lower costs inherent in very high production volume plumbing components in conjunction with an advantageous enjoyment of the control tolerances and material selection for such components. Because of the inherent light weight and rigidity of the PVC plumbing elements, advantage further may be achieved with a ground mounting arrangement involving a conventional plumbing drain and a user selected patio block. The relatively heavier weight of the patio block when combined with the very light weight of the rigid PVC components permits the feeding station to be quite stable structurally even though it is merely supported from that singular paving block which sits at ground level. No elaborate holes need be dug with supporting concrete to install a bird feeding station. Additionally, such a structural foundation permits the bird feeder station to be moved, as a whole, from place to place until an ideal location for attracting wild birds is found. As an additional advantage, the lightweight PVC parts may be shipped in commerce at practical costs.

Other objects of the invention will, in part, be obvious and will, in part, appear hereinafter.

The invention, accordingly, comprises the apparatus possessing the construction, combination of elements, and arrangement of parts which are exemplified in the following disclosure.

For a fuller understanding of the nature and objects of the invention, reference should be had to the following detailed description taken in conjunction with the accompanying drawings.

BRIEF DESCRIPTION OF THE DRAWINGS

FIG. 4 is a front view of apparatus according to the invention including an extender pipe and three additional feeder modules;

FIG. 5 is a partial cross-sectional view taken through the plane 5—5 in FIG. 4;

DETAILED DESCRIPTION OF THE INVENTION

The modular aspects of the bird feeding station system or apparatus of the invention lends itself to a variety of configurations. Thus, in the discourse to follow, a more basic structure initially is described, whereupon the description turns to more elaborate and more adaptive combinations of components. Because conventional PVC components as are employed in the plumbing trade are used principally in the formation of the devices according to the invention, where possible, their trade designations are used to describe them. Advantageously, the modular system permits the user initially to purchase more basic components such as a stanchion and only a single bird feeding assembly as something of a "starter" or introduction to the use, maintenance and enjoyment of a bird feeding station. As more familiarity with the subject matter of attracting and identifying birds is achieved on the part of its user, then components for attracting more varieties of avifouna can be contemplated with multiple combinations of module bird feeding assemblies with sub-module seed dispensers, suet mounts, and the like.

Figures 1, 2, 3:
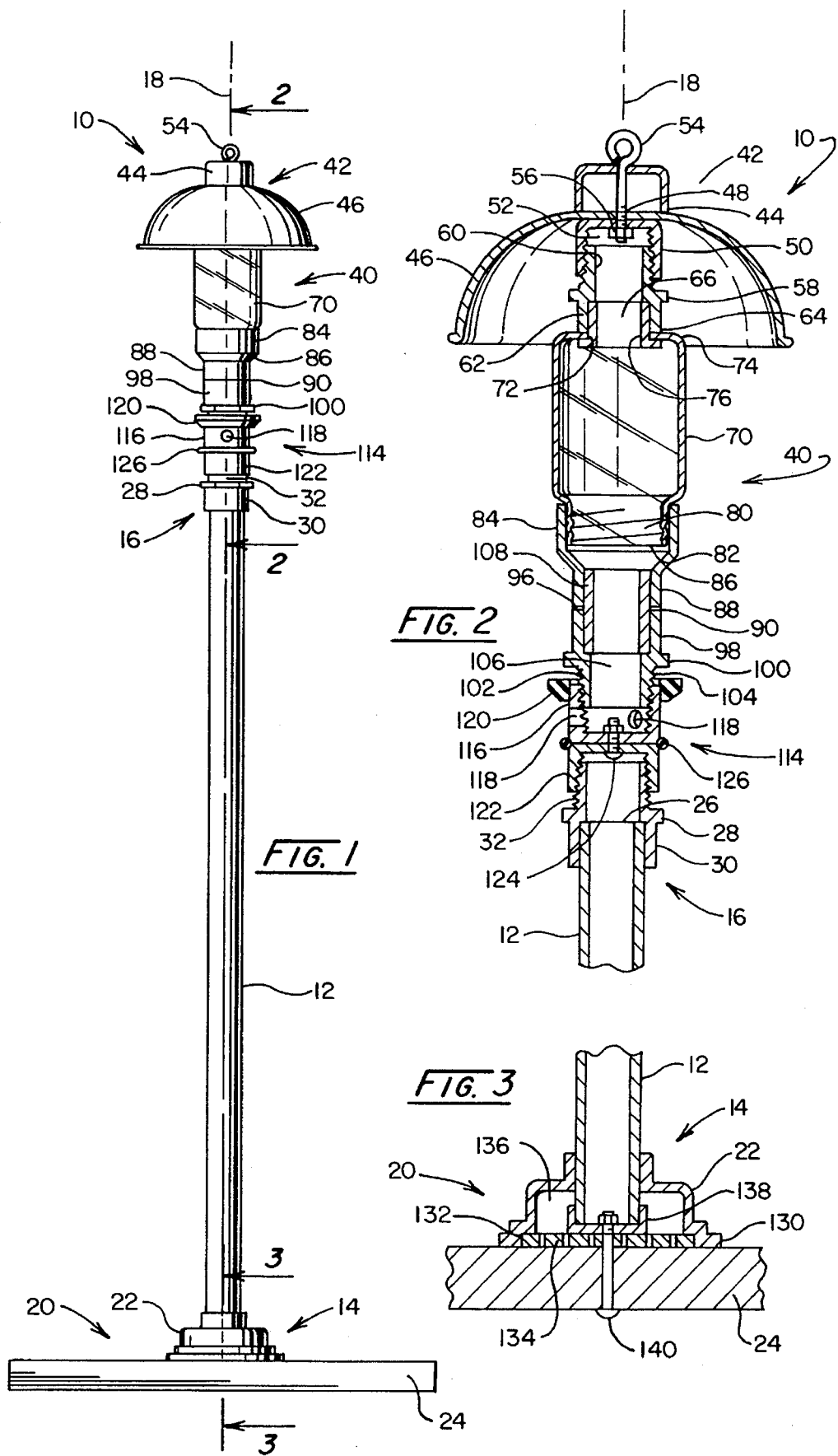
FIG. 1 is a front view of one basic embodiment of a bird feeding station according to the invention.
FIG. 2 is a cross-section of a bird feeding assembly portion of the apparatus of FIG. 1 taken through the plane 2—2 shown in that figure.
FIG. 3 is a partial cross-sectional view of the apparatus of FIG. 1 taken through the plane 3—3 shown therein.

Referring to FIG. 1, a basic embodiment of a bird station apparatus according to the invention is represented generally at 10. Apparatus 10 is seen to include an elongate polymeric cylindrical stanchion having a length of about 5 feet and formed of schedule 40 polyvinyl chloride (PVC). The pipe forming the stanchion 12 is referred to as "2 inch" pipe, that dimension representing an internal diameter (ID). Such conventional pipe components have an outside diameter of about 2⅜ inches. That diameter is selected particularly with respect to squirrels whose grasping appendages or paws are unable, for the most part, to reach around the pipe for purposes of climbing it. Typically, their climbing attempts are frustrated by virtue of both the diameter selected and the smooth exterior of such conventional PVC pipe. In general, to dissuade such predators, the external diameter should be about 2 inches or greater. That diameter also provides excellent rigidity for the structural aspects of the apparatus 10 and provides an internal passageway of adequate dimension for the utilization of an extender pipe. Stanchion 12 extends from a ground supportable lower region represented generally at 14 to an upper edge region represented generally at 16 and is symmetrically disposed about a vertical axis 18. Stanchion 12 is vertically supported about axis 18 by a base structure represented generally at 20 which includes a base component 22 which will be seen to be comprised of an inverted drain and which is affixed to a heavy ground support 24. Ground support 24 may conveniently be, for example, a patio block formed of stone or cast concrete. Typically, the support 24 will have rectangular dimensions of about 18 inches times 18 inches.

Looking additionally to FIG. 2, the upper edge region 16 of stanchion 12 is seen to terminate in an upper edge 26. For the embodiment of FIG. 1, a 2 inch male pipe adapter 28 with a lower depending slip portion 30 is slideably positioned over the upper edge region 16 of stanchion 12. In this regard, an internal abutting annular ridge of the adapter 28 is retained in compressive abutment against the edge 26 of stanchion 12 as seen in FIG. 2. This union is not fixed by plastic welding or an adhesive since such an arrangement is not necessary and the removability of the arrangement promotes various alterations to the overall modular structure 10. Integrally formed with the adapter 28 is an upwardly depending male, externally threaded component 32.

Thus configured, the adapter 28 functions to support one embodiment of a modular bird feeding assembly represented generally at 40. Looking to the components of assembly 40 from top to bottom, a cap assembly is shown generally at 42 which comprises an upper pipe cap which may be provided, for example, as a conventional 2 inch pipe cap with a slip interior. Next provided is a rain hood 46 which preferably is provided as a conventional thin stainless steel mixing bowl which is inverted and is provided with a small hole centrally disposed at the bottom thereof as at 48 (FIG. 2). This rain hood 46 is an optional feature. Next provided with the cap assembly 42 is a lower disposed pipe cap 50 with an internally threaded two inch downwardly extending female threaded coupling having threads 52. Retaining the assembly 42 together is an eyebolt 54 cooperating with a conventional nut 56. This eyebolt 54 represents a portion of the modular concept of the apparatus 10 in that it provides for hanging the bird feeding assembly 40 in a more elaborate overall feeder station structure.

Next occurring in the downward sequence of components of assembly 40 is a top male pipe adapter 58 which may be provided as a conventional 2 inch adapter having an upwardly disposed threaded male coupling 60. This male coupling 60 is removably threadably engaged with the internal threads 52 of lower disposed pipe cap 50. This provides for simple removal of the assembly 40 by grasping the body portion thereof and turning it just a few turns. Such removal is for the purpose of replenishing the bird seed supply as well as for cleaning. Integrally formed with the adapter 58 is a downwardly extending slip coupling portion 62 with a downwardly disposed annular edge 64. Edge 64 surmounts a cavity opening which is a portion of a passageway 66 extending through coupler 58.

Next in the sequence of components is a jar-shaped seed reservoir 70. This reservoir 70 may be provided as a conventional polymeric "Mason" style jar which is inverted. An opening of circular periphery is cut in the bottom of this jar at 72 and the region around opening 72 of the jar bottom 74 abuts against the downwardly disposed annular edge 64 of adapter 58. Opening 72 is aligned with the passageway 66 and a permanent connection between annular edge 64 and the bottom 74 of this jar representing the reservoir 70 is provided by an adhesive or plastic welding compound which is provided in conjunction with a 2 inch to 1½ inch reducing bushing 76. A suitable plastic welding compound for providing this connection is, for example, a product marketed under the trade designation Genova All Purpose Cement by Wiltic Chemical, of Davison, Mich. 48423.

The jar representing the bird seed reservoir 70 is transparent and extends to a conventional threaded neck or end 80 and associated opening at 82.

The neck or end opening 80 of the seed reservoir jar 70 is affixed by an adhesive or the noted plastic welding compound to the slip interior of the top portion 84 of a slip type reducing coupling 86. Coupling 86 further integrally incorporates a downwardly depending bottom slip coupling portion 88 of cross-sectional dimension or diameter less than the top portion 84. Bottom coupling portion 88 extends to an annular edge 90. Positioned adjacent to this annular edge 90 is the corresponding annular upwardly disposed edge 96 of the upwardly extending slip coupling portion 98 of a bottom male pipe adapter 100. Generally, annular edges 90 and 96 will be in abutment as part of their securement. Pipe adapter 100 also includes an integrally formed downwardly disposed male coupling 102 which is externally threaded as at 104. As in the case of top male pipe adapter 58, the adapter 100 is formed having a centrally disposed passageway or cavity 106 within which is adhesively attached a piece of 2 inch pipe 108 which is adhesively attached or attached by plastic welding compound to the inside surfaces of slip coupling 88 and adjacent slip coupling portion 98. Thus, bottom male pipe adapter 100 is permanently affixed to reducing coupling 86 while providing a clear seed delivery channel from the seed reservoir 70.

Threadably removably attached to the bird feeding assembly 40 at the threaded downwardly disposed male coupling 102 is a seed dispensing module represented generally at 114. Module 114 particularly is adapted to attract those specific birds such as nuthatches, titmice, and chickadees. Because of its configuration, other birds generally will be unable to achieve an adequate perch stable enough to effectively remove seed.

Seed dispensing module 114 basically is formed of two pipe caps. In this regard, the upwardly opening pipe cap having an internally threaded sidewall is seen at 116 threadably engaging the external threads 104 of downwardly disposed male coupling 102. Formed within the lower region of the pipe cap 116 are three feeding ports 118, two of which are seen in FIG. 2 and another of which is seen in FIG. 1. These feeding ports 118 may, for example, have a nominal ½ inch diameter for the purpose of dispensing such seeds as sunflower seeds. Disposed about the upper portion of cap 116 is a polymeric foam gasket 120 which serves as bird foothold for such birds as nuthatches which typically feed in an upsidedown position. Gasket 120 is located just above the feeding ports 118, a location ideal for such species specific feeding. Gaskets as at 120 are typically referred to as toilet tank-to-bowl washers, marketed by Plumb Shop, of Smithfield, Mich. 48034, under the part designation No. PS 2093.

Secured to the bottom surface of pipe cap 116 is another pipe cap 122 which, as before, is internally threaded. The connection of pipe cap 122 to pipe cap 116 is seen as a conventional bolt and nut assembly 124. Note that the internally threaded sidewalls of pipe cap 122 removably engage the corresponding threads of externally threaded male component 32 so as to provide a mounting for the modular bird feeding assembly 40 in the arrangement of FIG. 1. Another bird foothold is provided with the arrangement of the two caps 116 and 122. In this regard, a 3/16 inch diameter flexible polymeric O-ring 126 is provided. O-ring 126 is identified by industry standard No. 333 and has a 2½" internal diameter. Device 126 is mounted at the juncture of the end portions of the two caps 116 and 122 which are joined by the bolt assembly 124. The radius or rounded structure of the pipe caps 116 and 122 between their sidewalls and end portions provides an ideal groove for retaining O-ring 126 in position. This O-ring 126 functions to provide a foothold for such birds as nuthatches, titmice, and chickadees, other birds gaining a foothold only with great difficulty. Thus, the seed dispensing module 114 is species specific in its construction. FIG. 2 also reveals the connection between the assembly of module 40 and sub-module 114 with the 2 inch male pipe adapter 28 which is mounted upon stanchion 12. Note that the slip portion 30 thereof readily slides over the upper edge of stanchion 12 for the instant embodiment. The entire assemblage of module 40 and sub-module 114 also may be hung from the eyebolt 54 and the downwardly depending pipe cap 122 may be employed to attach another feeder module.

Referring to FIG. 3, the base component 22 and its attachment with patio block 24 is revealed at an enhanced level of detail. As noted above, this base component 22 is a common inverted drain having a downwardly disposed flange 130 surmounting an opening of circular periphery represented generally at 132. Normally, this opening will have a grate for filtering debris from the water which may enter the drain. This grate reappears in the present embodiment at 134 to serve as a disk member which is coupled, for example, by plastic welding, adhesive or the like to the drain flange 130 to provide a bottom surface. Bolted within the cavity 136 thus established by the grate 134 and the drain 22 is a conventional pressure cap 138, the end portion of which is attached to the inside surface of grate 134 by bolt and nut assembly 140 which extends, in turn, through the patio block 24. With the arrangement shown, the lower edge of stanchion 12 slides through the connection opening of drain 22 and is secure from lateral movement by pressure cap 138 which functions as an anti-shift stabilizer.

Referring to FIG. 4, another embodiment of the bird feeding station is represented generally at 150. In this embodiment, the stanchion 12 reappears with a ground supportable lower region 14. This ground support is implemented with the earlier-described drain 22 and patio block 24. As before, the stanchion 12 extends to an upper edge region 16 and, looking additionally to FIG. 5, to an edge 152. Positioned over this edge 152 as well as over the upper region 16 of stanchion 12 is an alignment fitting which may be provided as a female-to-female reducing slip fitting which may, for example, be of a variety converting from 2 inch pipe to 1½ inch pipe (internal diameter). Slideably extending downwardly through this fitting 154 is a polymeric extender pipe 156 having a length of about 5 feet and a nominal internal diametric size of 1¼ inch. The lower end of pipe 156 is configured having one-half of a coupler 158 attached thereto by plastic welding material or adhesive. This coupler 158, for the present embodiment, is a coupler intended for 1¼ inch pipe. The coupler functions to align the bottom of the extender pipe 156 along the internal surface of stanchion 12. FIG. 5 also reveals the presence of a sequence of transversely oriented, vertical positioning holes extending along pipe 156 and through which a stainless steel pin or the equivalent as at 162 may be inserted to provide for height adjustment. It may be observed that pin 162 abuts against the upper end surface of fitting 154. FIG. 5 also shows a predator or squirrel baffle shown generally at 164 and comprised of an inverted mixing bowl 166 which may be formed, for example, of stainless steel or plastic. Generally, the bowl 166 may have an outer diameter of about 9 inches. Bowl 166 is slideably positioned over the extender 156. In this regard, the bowl is fashioned having a hole formed therein through which a 2 inch to 1½ inch conventional PVC bushing 168 is inserted. The inner side of this bushing 168 is secured by a half inch length of pipe 170 which is plastic welded or adhesively secured to the inserted end of the bushing 168. As noted, the entire assembly simply slides over the extension pipe 156 and is seen to rest against the pin 162.

FIG. 4 shows the extension pipe 156 as it is positioned at an elevation typically elected by the user for optimized bird access and attraction. The extender pipe 156 is seen to be connected at its upper end 172 with a polymeric (PVC) tee or transverse coupling 174. The downwardly depending female slip coupling 176 of tee 174 slides over the upper end 172 of extender pipe 156 so as to horizontally align what may be considered as two transverse couplings 178 and 180. In its general embodiment, the tee 174 is of a 1¼ inch size and in order to accommodate a polymeric transverse pipe 182, the noted common passageway between couplings 180 and 178 is lined with a short length of 1¼ inch internal diameter polymeric pipe which is retained in place by plastic welding material, adhesives, or the like. So arranged, the transverse pipe 182 which is slideably mounted across and within couplings 178 and 180 may be of nominal 1 inch (internal diameter) size. Caps as at 184 and 185 are positioned and attached by plastic welding material adhesives and the like to the ends of transverse pipe 182. Each of these caps supports an eyebolt as shown, respectively, at 186 and 187. Suspended from eyebolt 187 is a modular bird feed assembly represented generally at 190. Assembly 190 is structured essentially identically as that described at 40 in connection with FIGS. 1 and 2 but may have a larger capacity seed reservoir 192. In general, the complementing components are scaled up accordingly, such components including the ring hood 194 and slip type reducing coupling 196. The remaining components will, in general, remain the same, including the cap assembly 198. However, the seed dispensing module earlier described at 114 now is represented at 200. Module 200 includes a pipe cap 202 with feeding ports as at 204 as well as lower disposed pipe cap 206. The common bolt assembly is as earlier described at 124 in connection with FIG. 2. Now, however, the assembly retains a disk-shaped seed tray 208 in a generally horizontal orientation. Tray 208 may be fashioned from a polymeric dish or from a metal such as stainless steel. Preferably, the tray will have holes for draining located in it and may additionally be configured having a concentric ring (not shown) spaced about 1 inch from the upper pipe cap 202 to minimize seed scatter. As may be apparent, other modules may be suspended from the internally threaded component of pipe cap 206. The module 190 readily is hung and removed from eyebolt 187 by a double ended metal snap fastener 210. The metal construction for fastener 210 is desirable inasmuch as squirrels and the like may be successful in alighting upon the transverse pipe 182 and the components which such a animal will confront will be unchewable, such that a module 190 will remain suspended under such conditions.

Suspended from eyebolt 186 through double ended metal fastener 214 is a thistle reservoir module represented at 216, the upper components of which are formed substantially identically as those shown in FIG. 2. In this regard, the module 216 includes a top male pipe adapter 218 which is configured identically with that described at 58 in connection with FIG. 2. The upwardly disposed male, externally threaded component of adapter 218 is threadably engaged with the internally threaded sidewall of pipe cap 220 in the same manner as component 58 engages pipe cap 50 as described above. An eyebolt is coupled to the upper end portion of pipe cap 220 as shown at 222. Eyebolt 222 is removably engageble with one side of the fastener 214. The thistle seed reservoir is a small polymeric jar 224 having very small thistle seed access ports along its neck portion, one of which is seen at 226. Connection between adapter 218 and the jar 224 is at the normal bottom surface of the jar and is provided with a reducing bushing as described at 76 in FIG. 2. For the smaller embodiment represented by module 216, a plastic screw-on lid 228 is used for connecting a downwardly opening bottom pipe cap 230 to the assembly. Eyebolts with elongate shafts, preferably carrying a rubber tube insert are bolted to this pipe cap 230 near its end portion. Two of these eyebolt form of perches are shown at 232. A more secure union of the neck of the jar 224 with its cap 228 can be realized by positioning a pipe cap of lesser size, for example having a 2 inch outer diameter with a downwardly facing threaded cavity over the end portion of pipe cap 230. This component (not shown) may also serve to hold down the lid 228 upon the end portion of pipe cap 230. With the arrangement shown, an internally threaded downwardly open cavity is made available from the pipe cap 230. This threaded cavity functions as a connector for a next downwardly adjacent feed assembly represented in general at 240. Assembly 240 is intended for feeding woodpeckers. In this regard, the assembly is somewhat species selective inasmuch as it retains a conventional suet container which is inverted such that the suet is available only from underneath. It has been observed that only woodpeckers are capable of grasping a commercial suet cage from underneath to carry out feeding. Such cages are marketed, for example, as a Hanging Suet Basket by C&S Products Co., Inc. of Fort Dodge, Iowa 50501. That commercial suet cage is represented at 244. Cage 244, containing the inverted suet container, is suspended from a pipe plug 242 by three chains as at 246, one of which includes another of the noted metal double ended hand actuable fasteners as at 248. The chains 246 are coupled to an eyebolt 250 which is connected to the downwardly depending bowl wrench access portion typically provided with plugs as at 242. Preferably, the fastener 248 in addition to supporting one portion of the cage 244, functions to hold its hinged door in a closed orientation. As is apparent, the assembly 240 is one of a variety of feeder assembly modules according to the invention which may be attached by the simple expedient of threadable engagement.

It may be observed that the transverse pipe 182 is unsymmetrically positioned within the tee 174. This accommodates for the heaver weight, for example, of feeder assembly 190 as opposed to the combined assemblies 216 and 240. Without such an arrangement, there may be a tendency for the lightweight assembly to tilt. Thus, the advantage of lightweight and simplicity of anchoring using patio block 24 is retained even though modules of different weights are employed. The tee 174 may be exchanged with a dual assembly representing an x-coupling with, for example, a cross and a tee for receiving two lengths of transverse pipes as opposed to the singular pipe 182.

Figure 6:
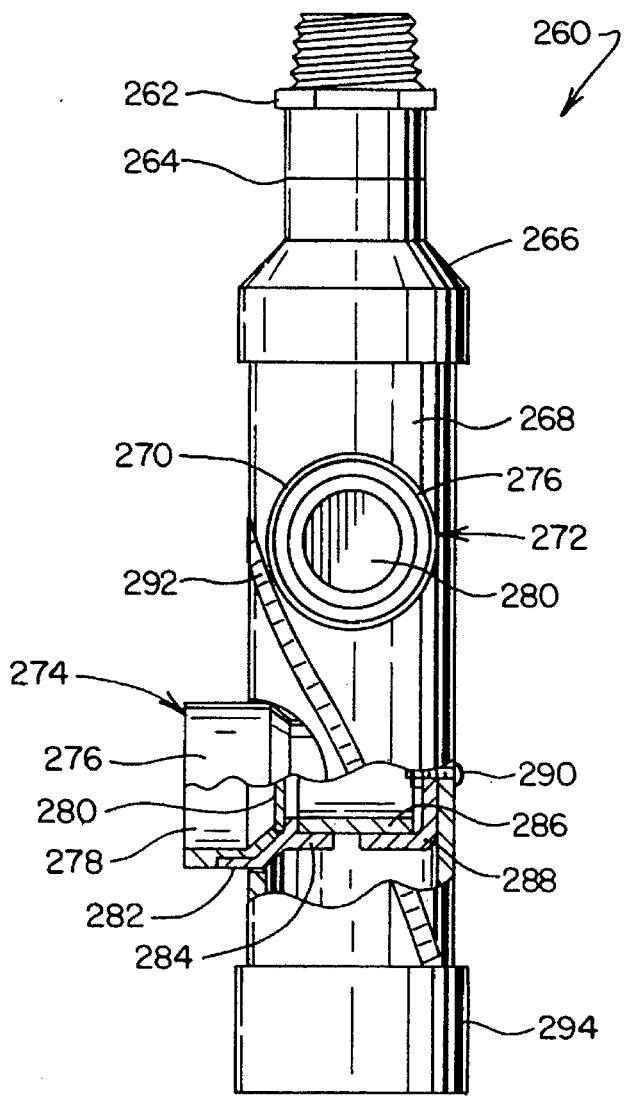
FIG. 6 is a front view of another feeder module with portions broken away to reveal internal structure.

Referring to FIG. 6, another feeding assembly which may be employed with the system of the invention is represented generally at 260. Assembly 260, carrying a suet food, is particularly adapted for accommodating woodpeckers. The device includes, from the top down, a 2 inch male pipe adapter 262 having an upwardly extending externally threaded male coupling for connection with a cap structure, for example as shown at 42 in FIG. 2, which structure also may include a rain hood as at 46 in that figure. The downwardly disposed slip coupling component of the connector 262 extends to an annular edge represented at 264. Next adjacent to the adapter 262 is a slip type reducing fitting, for example a 2 inch to 3 inch fitting, as shown at 266. The fitting 266 and adapter 263 are connected by plastic welding material or a suitable adhesive in conjunction with a reinforcing 1½ or 2 inch length of pipe in the connecting manner as shown earlier at 108 in FIG. 2. The larger or 3 inch side of fitting 266 is attached by plastic welding material or suitable adhesive to the upper edge of a length of 3 inch (internal diameter) PVC pipe 268. Pipe 268 may have a length, for example, of about 1 foot. Two circular openings of about a 3 inch diameter as shown at 270 and 271 are formed in the pipe 268. These openings are mutually disposed at a 90° angle. Feed support openings 270 and 271 each serve to receive a suet retainer as shown respective at 272 and 274. Retainers 272 and 274 are configured identically and, looking in particular to retainer 274, it may be observed that it comprises in horizontal sequence, a slip reducing bushing 276 having a passageway 278 therethrough, and further having its reducing portion cut short to a length of about ⅛ inch. Against the resultant rearwardly facing edge of this foreshortened length, there is positioned an aluminum disk 280. Bushing 276 is inserted within and attached by plastic welding or suitable adhesive to a reducing coupler 282 having a rearwardly extending sub-portion 284 which is removably slideably inserted over a short length of 1½ inch PVC pipe 286. Pipe 286, in turn, is received within the internal slip surface of a pipe cap 288. Attachment is made between pipe 286 and cap 288 utilizing a plastic welding material or adhesive. Cap 288, in turn, is bolted to the internal wall of feed support pipe 268 utilizing a bolt and nut assembly represented at 290.

Positioned upon the feed support pipe 268 and oriented in diagonal adjacency with the feed support openings 270 and 271 is a scale 292 having, for example, indicia in inches from 1 inch to 9 inches. This aids the user in identifying certain birds which are quite similar in shape and color patterns, but are different in length. For example, the Downy woodpecker is considered to have a length of about 6½ inches. This bird is almost identical with the Hairy woodpecker, with the exception that the latter has a typical length of about 9½ inches. The scale 292 will aid, for example, in distinguishing these two birds. For aesthetic purposes, a 3 inch slip coupler as at 294 may be connected to the bottom of feed support pipe 268. Connection may be by plastic welding material, adhesives, or the like.

Figure 7:
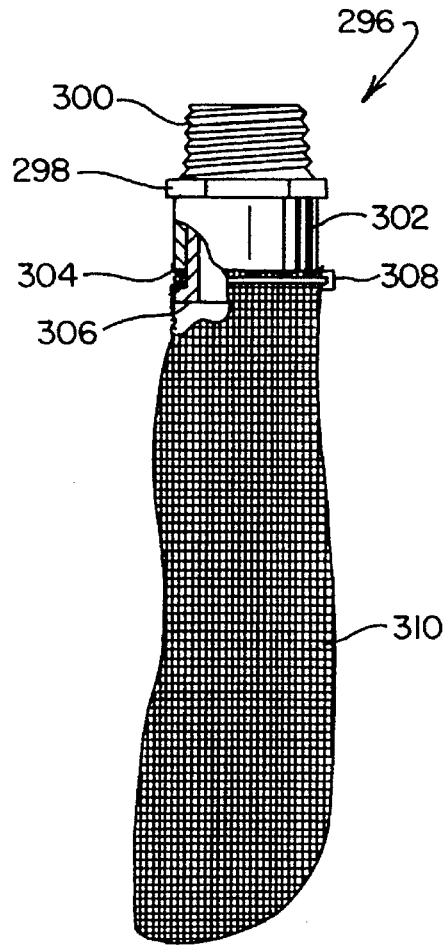
FIG. 7 is a front view of still another feeder module with portions broken away to reveal internal structure.

Referring to FIG. 7, another modular embodiment for a feeding assembly is depicted generally at 296. Assembly 296, as before, is configured having an upper 2 inch male pipe adapter formed of PVC with an upwardly extending externally threaded male coupling portion 300. The lower slip coupling portion 302 of adapter 298 is seen receiving a slip bushing 304 having an outwardly depending flange 306. Bushing 304 is connected to the interior of portion 302 using a plastic welding material adhesive or the like and is seen connected such that the flange 306 is spaced downwardly from the lower edge of portion 302 a distance of about ¼ inch. This provides a channel for receiving a plastic band or connector 308 which functions to retain a woven thistle sock 310. Thistle socks 310 are commercial items available to the public through commercial outlets. One such thistle sock is marketed under the trade designation Thistle Sack, by C&S Products Co., Inc., of Fort Dodge, Iowa 50501. As is apparent, the thistle feeder 296 readily is coupled to cap assemblies as at 42 as described in conjunction with FIG. 2. It also may be attached, for example, to the downwardly depending internally threaded pipe cap 206 shown in FIG. 4 in conjunction with seed dispensing module 200.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. Bird feeding station apparatus, comprising:

a polymeric elongate cylindrical stanchion of predetermined diameter vertically extensible from a ground supportable lower region to an upper edge region;

station support means for supporting at least one bird feeding assembly by support from said stanchion upper edge region;

one first said bird feeding assembly supportable from said station support means being a feeding assembly comprising in sequence from top to bottom, a cap assembly with a downwardly extending female threaded coupling, a top male pipe adapter having an upwardly disposed threaded male coupling threadably, removably engageable with said cap assembly female threaded coupling and a downwardly extending first slip coupling portion with a downwardly disposed edge surmounting a cavity first opening, a transparent jar-shaped seed reservoir having a first end abuttably engaging said downward edge and a second opening aligned with and substantially co-extensive with said first opening, said reservoir having a second end oppositely disposed from said first end with a third opening, coupling means for connecting said seed reservoir first end with said first slip coupling downwardly disposed edge, a reducing coupling with a top portion of cross-sectional dimension for receiving and coupling to said reservoir second end and a downwardly depending bottom portion of cross-sectional dimension less than said top portion extending to a downwardly disposed annular edge, a bottom male pipe adapter having an upwardly extending second slip coupling portion with an upwardly disposed edge surmounting a cavity second opening coextensive with and adjacent said annular edge, having a downwardly disposed male coupling, said bottom male pipe adapter being connected with said reducing coupler, and a seed dispensing module threadably removably engageable with said bottom male pipe adapter threaded male coupling.

2. The bird feeding station apparatus of claim 1 in which a said seed dispensing module comprises:

an upwardly opening pipe cap having an internally threaded side wall extending upwardly from an end portion to an edge, said sidewall having at least one feeding port extending therethrough, said internally threaded sidewall being removably threadably engageable with said downwardly disposed threaded male coupling of said bottom male pipe adapter; and a first bird foothold device formed of flexible polymeric material, mounted substantially at the juncture between said upwardly opening cap sidewall edge and said bottom male pipe adapter.

3. The bird feeding station apparatus of claim 1 in which said coupling means comprises a reducing bushing having an cylindrical slip coupling extending through said reservoir second opening engaged and fixed within said male pipe adapter first slip coupling portion and having a collar portion engaging said reservoir first end to effect its coupling with said male pipe adapter downward edge.

4. The bird feeding station apparatus of claim 1 including a predator baffle configured as an inverted bowl mounted at said station support means.

5. The bird feeding station apparatus of claim 1 in which a said seed dispensing module comprises:

an upwardly opening pipe cap having an internally threaded side wall extending upwardly from an end portion to an edge, said sidewall having at least one feeding port extending therethrough, said internally threaded sidewall being removably threadably engageable with said downwardly disposed threaded male coupling of said bottom male pipe adapter; and a second bird foothold formed of flexible polymeric material mounted at said upwardly opening cap end portion below said feeding port.

6. The bird feeding station apparatus of claim 1 in which a said seed dispensing module comprises:

an upwardly opening pipe cap having an internally threaded side wall extending upwardly from an end portion to an edge, said sidewall having at least one feeding port extending therethrough, said internally threaded sidewall being removably threadably engageable with said downwardly disposed threaded male coupling of said bottom male pipe adapter; and a dish-shaped tray mounted at said upwardly opening cap end portion below said feeding port.

7. The bird feeding station apparatus of claim 1 in which a said seed dispensing module comprises:

an upwardly opening pipe cap having an internally threaded side wall extending upwardly from an end portion to an edge, said sidewall having at least one feeding port extending therethrough, said internally threaded sidewall being removably threadably engageable with said downwardly disposed threaded male coupling of said bottom male pipe adapter; and a downwardly opening pipe cap having an end portion coupled to and forming an interface with said upwardly opening pipe cap end portion and having an internally threaded sidewall extending downwardly from said end portion thereof; and a bird foot hold device positioned at said interface intermediate said upwardly opening cap end portion and said downwardly opening end portion.

8. The bird feeding station apparatus of claim 7 in which:

each said end portion of said upwardly opening pipe cap and said downwardly opening pipe cap are rounded at said interface to mutually define a groove; and said bird foothold device is an O-ring retained at said groove.

9. The bird feeding station apparatus of claim 7 in which:

said station support means comprises a male pipe adapter having a downwardly depending slip reducing bushing portion supported from said stanchion upper edge region and an upwardly extending male, externally threaded seed dispensing module support portion; and said downwardly opening pipe cap internally threaded sidewall is threadably engageable with said externally threaded seed dispensing module support portion.

10. The bird feeding station apparatus of claim 1 in which said cap assembly of said one first said bird feeding assembly comprises:

a first downwardly opening pipe cap having a sidewall extending downwardly from a first end portion to a first edge;

a second downwardly opening pipe cap with a sidewall extending downwardly from a second end portion and having said downwardly extending female threaded coupling formed therein; and a bowl-shaped rain hood connected intermediate said first edge and said second pipe cap second end portion.

11. The bird feeding station apparatus of claim 1 in which said stanchion is a cylindrical polymeric pipe having an outside diameter of at least about two inches.

12. The bird feeding station apparatus of claim 1 in which another, second said bird feeding assembly supportable from said station support means is a feeding assembly comprising in sequence from top to bottom:

a male pipe adapter having an upwardly extending, externally threaded male coupling for removable connection with and support by said station support means, and a downwardly depending slip coupling portion extending to an annular first edge;

a reducing fitting having an upwardly disposed first slip portion of given diameter extending to an annular second edge coextensive with and positioned in abutment with said annular first edge and having a downwardly disposed second slip portion of diameter greater than said given diameter;

second connector means for retaining said annular second edge against said annular first edge, a feed support pipe having a sidewall and an upper edge region connected to said second slip portion, a feed support opening formed within said feed support pipe sidewall; and a suet retainer retained within said feed support opening, comprising, in horizontal arrangement, a slip reducing fitting, a passageway blocking disk, a reducing bushing and a pipe cap.

13. The bird feeding station apparatus of claim 12 including a scale, having length indicia thereon fixed to said feed support pipe sidewall in diagonal adjacency with said feed support opening for facilitating a visual determination of the length of a bird feeding at said suet retainer.

14. The bird feeding station apparatus of claim 1 in which another, third said bird feeder assembly supportable from said station support means is a feeding assembly comprising, from top to bottom:

a pipe plug having an upwardly extending, externally threaded male coupling for removable connection with and support by said station support means, and a downwardly depending access portion;

an eyebolt connected to said pipe plug and providing a downwardly depending eye connector;

Suspension means coupled to said eye connector and having at least three connector components extending to connection ends;

a suet cage for retaining suet coupled to said connection ends and supportably suspended from said suspension means.

15. The bird feeding station apparatus of claim 1 including a base component, connectable with a ground support and comprising:

an inverted drain having a downwardly disposed flange surmounting an opening of circular periphery, a disk member positioned in covering relationship over said opening and fixed to said drain at said flange, said drain extending from said flange to an upwardly disposed slip opening of diameter corresponding with said stanchion predetermined diameter for receiving and supporting said stanchion lower region; and a pipe cap having an end portion fixed to said flange within said drain and having an upwardly extending slip portion of diameter corresponding with said stanchion predetermined diameter for slidably receiving said stanchion lower region and providing vertical support thereto with said drain upwardly disposed slip opening.

16. Bird feeding station apparatus, comprising:

a polymeric elongate cylindrical stanchion of predetermined diameter, having an internally disposed passageway and vertically extensible from a ground supportable lower region to an upper edge region;

an alignment fitting having a slip portion slideably engageable with said stanchion upper edge region and having an upwardly extending reducing female slip portion of given diameter;

a polymeric extender pipe having an outer diameter corresponding with said alignment fitting given diameter, having a lower end slideably retained within said stanchion passageway and extending vertically to an upper end located upwardly, outwardly from said alignment fitting;

height adjustment means connectable with said extender pipe for positioning said upper end thereof at select locations above said alignment fitting;

a polymeric transverse coupling having a downwardly depending female slip coupling mounted upon said extender pipe upper end, and movable therewith, said transverse coupling including at least two parallel oppositely and horizontally disposed slip couplings;

at least one polymeric transverse pipe supported from a said horizontally disposed slip coupling and extending therefrom to a first end to which is coupled a first pipe cap having a first eye connector connected thereto for attachment with a bird feeding assembly;

one first said bird feeding assembly supportable from said first eye connector being a feeding assembly comprising in sequence from top to bottom, a cap assembly with a downwardly extending female threaded coupling and an upwardly disposed second eye connector, a top male pipe adapter having an upwardly disposed threaded male coupling threadably, removably engageable with said cap assembly female threaded coupling and a downwardly extending first slip coupling portion with a downwardly disposed edge surmounting a cavity first opening, a transparent jar-shaped seed reservoir having a first end abuttably engaging said downward edge and a second opening aligned with and substantially coextensive with said first opening, said reservoir having a second end oppositely disposed from said first end with a third opening, coupling means for connecting said seed reservoir first end with said first slip coupling downwardly disposed edge, a reducing coupling with a top portion of cross-sectional dimension for receiving and coupling to said reservoir second end and downwardly depending bottom portion of cross-sectional dimension less than said top portion extending to a downwardly disposed annular edge, a bottom male pipe adapter having an upwardly extending second slip coupling portion with an upwardly disposed edge surmounting a cavity second opening coextensive with and abutting said annular edge, having a downwardly disposed male coupling, said bottom male pipe adapter being connected with said reducing coupler, and a seed dispensing module threadably removably engageable with said bottom male pipe adapter threaded male coupling; and first connector means for hanging said first bird feeding assembly from said transverse pipe by connection between said first and second eye connector.

17. The bird feeding station apparatus of claim 16 in which:

said transverse coupling is a tee coupling in which said two horizontally disposed couplings define a horizontal passageway;

said transverse pipe extends through and is slideable within said horizontal passageway and includes a second end disposed horizontally opposite said first end and to which a second pipe cap is coupled, said second pipe cap having a third eye connector connected thereto for attachment with a bird feeding assembly; and a second said bird feeding assembly having an upwardly disposed fourth eye connector; and second connector means for hanging said second bird feeding assembly from said transverse pipe by connection between said third and fourth eye connectors.

18. The bird feeding station apparatus of claim 17 including a base component, connectable with a ground support and comprising:

an inverted drain having a downwardly disposed flange surmounting an opening of circular periphery, a disk member positioned in covering relationship over said opening and fixed to said drain at said flange, said drain extending from said flange to an upwardly disposed slip opening of diameter corresponding with said stanchion predetermined diameter for receiving and supporting said stanchion lower region; and a pipe cap having an end portion fixed to said flange within said drain and having an upwardly extending slip portion of diameter corresponding with said stanchion predetermined diameter for slidably receiving said stanchion lower region and providing vertical support thereto with said drain upwardly disposed slip opening.

19. The bird feeding station apparatus of claim 18 including a patio block coupled to said disk member, and having a surface area engageable with ground surface effective to retain said stanchion in a vertical orientation.

* * * * *